United States Patent
Polo et al.

(10) Patent No.: US 12,538,064 B2
(45) Date of Patent: Jan. 27, 2026

(54) SOUND REPRODUCTION SYSTEM AND RELATED PROCESS

(71) Applicant: WISYCOM S.R.L, Tombolo (IT)

(72) Inventors: Massimo Polo, Tombolo (IT); Enzo Frigo, Tombolo (IT)

(73) Assignee: WISYCOM S.R.L., Tombolo (IT)

( * ) Notice: Subject to any disclaimer, the term of this patent is extended or adjusted under 35 U.S.C. 154(b) by 217 days.

(21) Appl. No.: 18/366,987

(22) Filed: Aug. 8, 2023

(65) Prior Publication Data

US 2024/0048888 A1 Feb. 8, 2024

(30) Foreign Application Priority Data

Aug. 8, 2022 (IT) .......................... 102022000016929

(51) Int. Cl.
*H04R 1/10* (2006.01)
*G06F 3/16* (2006.01)
*H03F 3/217* (2006.01)

(52) U.S. Cl.
CPC ........... *H04R 1/1041* (2013.01); *G06F 3/162* (2013.01); *G06F 3/165* (2013.01); *H03F 3/217* (2013.01); *H03F 2200/03* (2013.01)

(58) Field of Classification Search
CPC ................................ H04R 1/1041; H04R 1/10
USPC .......................................................... 381/74
See application file for complete search history.

(56) References Cited

U.S. PATENT DOCUMENTS

| | | | |
|---|---|---|---|
| 7,924,960 B1 * | 4/2011 | Chi | H03F 3/217 370/232 |
| 10,827,259 B2 * | 11/2020 | Fontana | H04R 1/406 |
| 11,076,248 B2 * | 7/2021 | Holter | G10L 21/0216 |
| 11,259,164 B2 * | 2/2022 | Rodriguez | H04L 1/0003 |
| 11,451,913 B2 * | 9/2022 | Heineman | H04H 60/04 |
| 11,699,425 B2 * | 7/2023 | Ozluturk | G10K 11/17873 381/71.6 |
| 11,838,718 B2 * | 12/2023 | Raft | H04R 1/1083 |
| 12,035,097 B2 * | 7/2024 | Kulavik | H04R 1/1041 |
| 2005/0113058 A1 | 5/2005 | Gosieski, Jr. | |
| 2006/0182287 A1 | 8/2006 | Schulein et al. | |

FOREIGN PATENT DOCUMENTS

WO 2015/047426 A1 4/2015

OTHER PUBLICATIONS

Italian Search Report issued Mar. 30, 2023, in corresponding Italian patent application No. 102022000016929, 10 pages.

* cited by examiner

*Primary Examiner* — Disler Paul
(74) *Attorney, Agent, or Firm* — Maier & Maier, PLLC

(57) ABSTRACT

A sound reproduction system of signals having relative customizable parameters, the system including a first canalphone or bonnet suitable for receiving a signal, converting it, and subsequently reproducing it, when in use. Further, the system can include a transceiver connected to the first canalphone adapted to receive and transmit the signal to said canalphone. The embodiments may also relate to a process for sound reproduction using a system.

18 Claims, 2 Drawing Sheets

SOUND REPRODUCTION SYSTEM AND RELATED PROCESS

FIELD

The present invention relates to a sound reproduction system and to a related process.

The invention is in the technical field of sound reproduction systems and technologies, particularly in the technical field of music reproduction technologies.

In particular, the invention is part of those systems commonly called headphones or canalphones, which are used for the reproduction of sound, music or other multimedia content.

BACKGROUND

Such systems can be of different types and can be connected to particular apparatus by means of connecting cables or communicate with said apparatus by means of wireless technologies such as Bluetooth® technology.

Other variables of the systems known today may be related to the shape of the device, which may be single, with one connecting element between the two sound reproduction devices, or may comprise two different devices, connected and coordinated with each other, to be placed in the user's ears.

The conformation of these technologies of prior art may vary depending on the type of system used and the size of the system.

By way of example, such devices might be apt to be placed inside the ear of the user, partially protruding from it in order to be grasped.

Alternatively, such known devices could be fitted with a portion that follows the contour of the ears of the user, to ensure an optimal fit within the ear, when worn, or, they could be positioned entirely within the ear canal of the user, to prevent them from being seen from the outside.

Numerous such devices can be found on the market with different features depending on the need, for example, both at the level of use and application and at the level of the corresponding price range.

Typically, canalphones include multiple acoustic transducers. These acoustic transducers have limited bands, and in order to have good frequency response in the audible frequency range (20-20 KHz), two, three, four or more transducers (i.e., low, middle, treble, etc.) are needed. These acoustic transducers must therefore be individually driven to have better acoustic performance.

However, the solutions provided by the prior art have some critical issues.

In particular, devices according to the prior art present a complex system of hardware and software components that affect the size of the devices and the difficulty of their customization.

Present solutions use fixed equalization networks for the different transducers and have problems with cross over bands; in addition, fixed equalization networks have problems with component tolerances, which means that two canalphones even if produced with the same components and settings do not give the same acoustic response.

Additionally, current solutions do not allow for individual driving without common signals (the typical common signal is the ground signal), for this reason, in the prior art, it is not possible to use class D amplifiers within the canalphones, each connected to the specific transducer.

If, according to the prior art, it was desired to use class-D amplifiers, a multiplicity of wired connections would have to be used, which would make the use of canalphones almost impossible. In fact, the multiplicity of wires and connections that would have to use to transmit the data to the canalphone would make the cable containing them too thick and coarse for convenient use.

On the other hand, it would be advantageous to have the transducers and the amplifiers directly in the canalphone, so as to handle any audio feedback without delay (for example, for noise cancellation and to have audio feedback).

Another drawback due to this excess of components is relative to the proportional possibility that these components will encounter deterioration or breakage, more particularly during use in uncomfortable environments or circumstances.

Another critical aspect of the prior art is the fact that a user of such technologies, when the devices are in use, being totally acoustically isolated from the outside world is generally also unable to simultaneously hear of any distress signals or important conversations taking place in his or her proximity.

In particular, this critical issue may arise more if the devices are used by cyclists or road users during hazardous work or other possibly risky situations.

Alternatively, more simply, it may occur when a singer or musician has to receive directions/instructions while such devices are active.

In addition, the prior art presents solutions with limited ability for user customization and parameter setting.

SUMMARY

Therefore, the aim of the present invention is to provide a sound reproduction system and a related process that solves the mentioned drawbacks.

In particular, it is the aim of the present invention to realize a sound reproduction system and related process with fewer hardware and software components. To achieve this, the present invention uses a digital data channel multiplexed into several channels, of the bidirectional type. Advantageously, such multiplexed data channel comprises a power signal, for transmitting individual audios to the transducers of the canalphone, stored data, microphone signals and any commands. As a non-exhaustive example, it is intended to connect the canalphones with serial links, such as, again as a non-exhaustive example, $I^2S$ links (standard serial communication BUS interface).

Another aim of the present invention is to provide a sound reproduction system and related process, which has reduced dimensions compared to those described by the prior art.

Further aim of the present invention is to provide a sound reproduction system and a related process with a high degree of customization and adaptability according to different uses.

Another aim of the present invention is to provide a sound reproduction system and related process with a simple, intuitive and reliable user interface.

An additional aim of the present invention is to realize a sound reproduction system and related process capable of picking up sounds emitted nearby and directing them, via interface, to the user to avoid isolation from the outside world.

Another aim of the present invention is to realize a sound reproduction system and a related process that can be used in a wide range of situations and in even extremely diverse locations.

A further aim of the present invention is to realize a sound reproduction system and a related process that is easily usable and customizable by all types of users.

Finally, not the least aim of the present invention is to provide a sound reproduction system and related process that is feasible at low cost and aesthetically pleasing.

The invention thus conceived and disclosed herein is susceptible to numerous modifications and variations, all of which are within the scope of the inventive concept.

These and other aims are achieved by a sound reproduction system and related process according to the attached independent claims.

Further detailed technical features are given in the attached dependent claims.

BRIEF DESCRIPTION OF THE DRAWINGS

The present invention will now be described, by way of example but not limitation, according to some of its preferred embodiments, and with the aid of the attached figures, wherein.

DETAILED DESCRIPTION OF THE EMBODIMENTS

Figure 1:
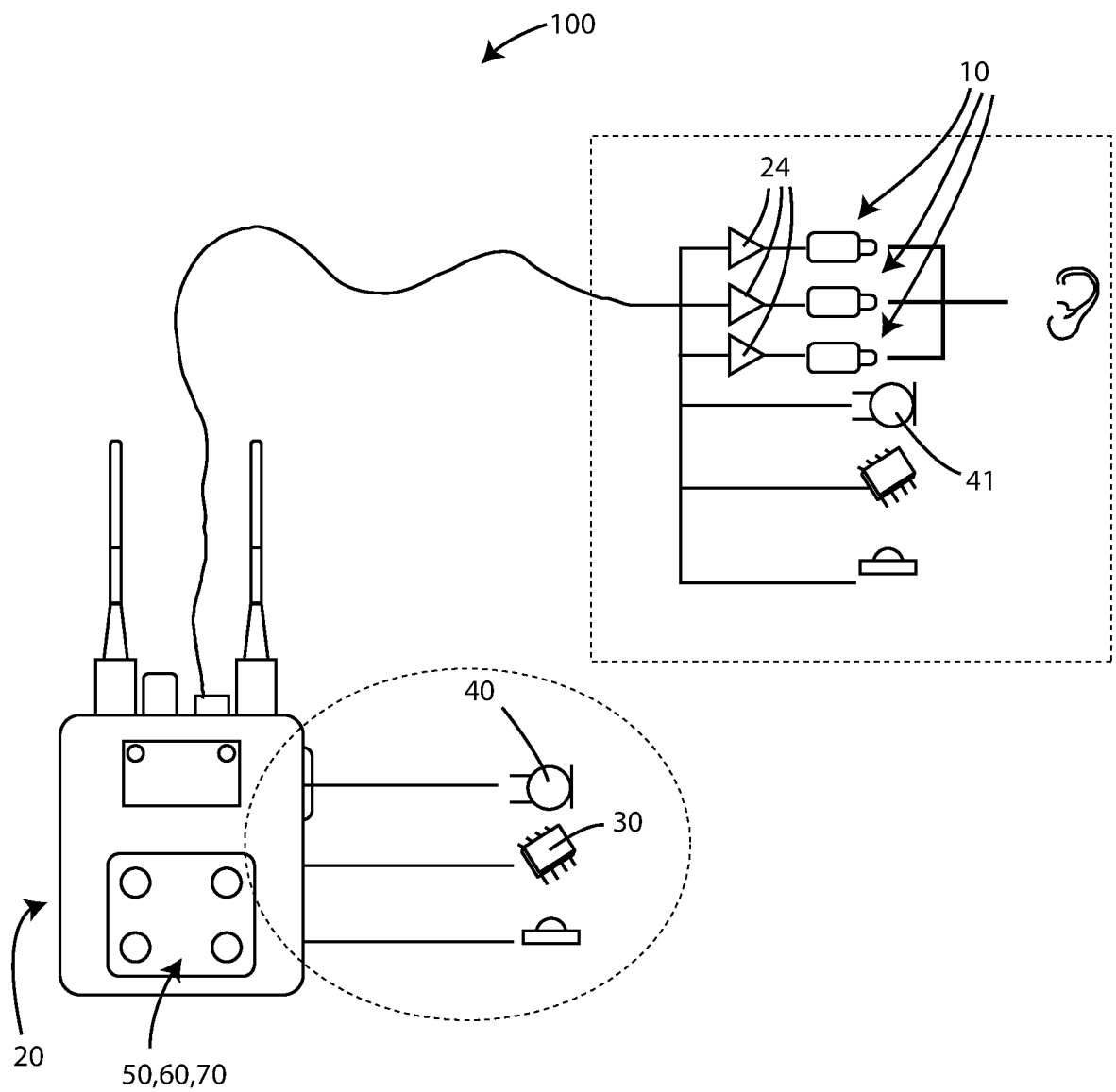
FIG. 1 shows a schematic figure of the sound reproduction system and related process, according to the present invention.

Referring to the figures, a preferred embodiment of the sound reproduction system 100 and related process according to the invention is shown.

In particular, the system 100 can be used in a plurality of fields and applications that are also very different from each other. By way of example, it can be used in the field of music by singers and/or musicians but also for simple music reproduction by a user.

Advantageously, the sound reproduction system 100, according to the present invention, comprises a first and a second canalphone 10, suitable for wearing to play sounds or other multimedia elements such as music, recordings, etc.

Each first canalphone 10 can be used either individually or independently with respect to the second canalphone 10, thus effectively allowing for a free ear as needed.

In addition, each canalphone 10 can be made in a plurality of different conformations and structures, as it is such that it follows the physiological pattern of the hearing apparatus of the users who will wear them, ensuring better performance and greater comfort and convenience of use.

An additional advantage relates to the fact that each canalphone 10 can be made in different shapes and colors, so as to increase the choice of possible buyers. In fact, for the aforementioned reasons, each canalphone 10 is customizable in its structural conformation and sound output for each specific user.

Each canalphone 10 is worn by a user, being inserted into the relevant ear so that the sound signal is emitted directly into the user's ear canal, as mentioned above, in one or both ears depending on the use or personal choice of each individual user.

Advantageously, the system 100, according to the present invention, also comprises an audio transceiver apparatus 20, by way of example a bodypack, which is connected to at least one of the aforementioned canalphones 10, so as to transmit the audio signal digitally to it, making it possible to use class D amplifiers 24 and to control and possibly modify relative parameters, as will be further explained below.

Advantageously, class D amplifiers 24 enable the conversion of digital data into analog data, without the need to use filtering systems.

Still advantageously, class D amplifiers 24 are energy efficient amplifiers and are often referred to as the best option for audio systems.

According to the present invention, advantageously, by way of example, the transmission of data (including audio) and energy between the transceiver 20 and the canalphones 10 is carried out via a digital data channel multiplexed into several channels, of the bidirectional type, with a power signal included, for the transmission of individual audios to the transducers of the canalphones 10, stored data, microphone signals, and any digital commands. Advantageously, this type of configuration leads to the achievement of several significant advantages, such as, but not limited to:

(a) a wiring harness with reduced complexity and size;
(b) a forward digital data channel that can handle four or more transducers;
(c) a return digital data channel for microphones 40, as will be discussed in more detail below;
(d) a return digital data channel for possible calibration, which can also be done in bodypack 20;
(e) a return digital data channel to handle any commands;
(f) a power/charge channel for canalphones 10.

An additional advantage of the present invention, related to the transmission of data and energy between the transceiver 20 and the canalphones 10 via a multiplexed digital data channel, is that the same wiring can be used as in existing systems, such as Trs jack (tip-left, ring-right, sleeve-ground-mass). For these reasons, it is therefore possible, through the above-mentioned system 100, to make the bodypack 20 backward compatible with existing systems.

In preferred but not limiting embodiments, the transceiver 20 is wearable by the user.

Figure 2:
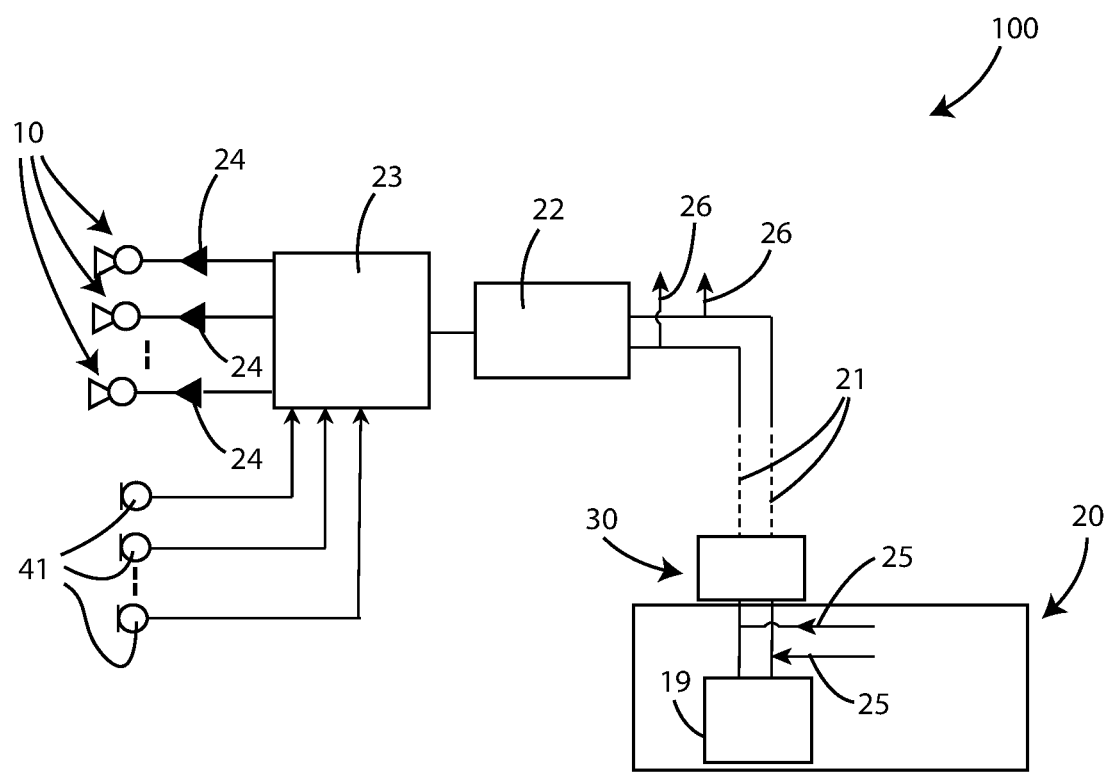
FIG. 2 is a schematic representation of the components of the sound reproduction system, according to the present invention.

Referring to FIG. 2, data (including audio) and energy output from the transceiver 20 are generated and processed by first processing means 19 such as one or more digital signal processors (DSPs), and are transmitted through converter means 22 such as BUS converters.

The converter means 22 are connected to second processing means 23, for example, other DSPs, for processing and digitally transmitting the aforementioned data and energy to the canalphones 10.

Specifically, converter means 22 enable the transmission of data in digital form that is transmitted to the processing means, which in turn carry out the processing required for output transmission to amplifiers 24 and canalphones 10.

As visible in FIG. 2, the second processing means 23 also receive data from microphones 40. Thus, the processing means process such data, which are also transmitted to amplifiers 24 or transceiver 20.

Advantageously, the use of converter means 22 and processing means 23 in addition to ensuring digital transmission also allows the possibility of using class D amplifiers 24.

Still advantageously, converter means 22 are able to process digital signals that are sent within a bidirectional communication serial BUS 21.

Advantageously, class D amplifiers 24 are placed inside the same canalphones 10.

With such a solution, it is possible not only to send digital signals to control system parameters, but also to send audio signals, microphone signals and commands also in digital form.

Again, with reference to FIG. 2, it is possible to carry out insertion of the power supply with an insertion element 25 downstream of the first processing means 19 and to carry out extraction of the same power supply downstream of the converter means 22, with an extraction element 26.

Even according to the present invention, transceiver 20 and canalphones 10 are connected with a bidirectional communication serial BUS 21 such as, for example, I²S communication serial BUS.

As visible in FIG. 2, the second processing means 23 are placed downstream of the converter means 22 and are connected to at least one class D amplifier 24 embedded in at least one respective canalphone 10. The amplifier 24 is suitable for performing the conversion of digital signals output from said processing means 23 into analog signals.

Advantageously, unlike known devices, the system 100 has a set of parameters that can be set and changed by the user himself.

Advantageously, these parameters can also be set and saved so as to be reused in similar circumstances of use without having to be recalibrated, optimizing time, or even set and changed before each use by the user, again as needed.

More in detail, since the aforementioned canalphones 10 are composed, according to the state of the art, of electroacoustic transducers, they are never perfectly equal to each other in terms of operation and, more importantly, due to structural limitations between two pairs of canalphones 10.

For this reason, an example of controllable parameters is related to the delays introduced by the transduction devices themselves, which will be modifiable in such a way as to balance any delays of the sound in the two ears of the user, making them equal.

Additionally, other parameters are related to frequencies. Specifically, through the system 100, it can then be made sure, by pre-distorting the signal coming out of the transceiver 20 or "bodypack," that high or low frequencies will be enhanced depending on the preference of the user. In general, it is possible to pre-distorter the input signal to each canalphone 10, so that the frequency response can be customized according to the wishes of the user.

This implementable example from the system that is object of the present invention is very important because the canalphones 10 have structurally limitations for handling parameters such as, for example, frequencies, not allowing the user particular types of customization of the system; therefore, by implementing a pre-distortion of the signal at the level of the transceiver 20 it is possible to enter the canalphone 10 with a signal that is already at least partially modified, which will then be refined by the canalphone within the limits of its customization.

Additionally, further parameters and/or customization possibilities of system 100 will be described in the following.

As visible in FIG. 1, the transceiver 20, in preferred but not limiting embodiments, is connected to a sound distribution radio apparatus. Just for completeness of information, this radio apparatus is basically used to collect or pick up signals from any wireless devices that are used.

In addition, the system 100 comprises an interface 30 apt to control the system 100 itself.

More in detail, such interface 30 could always be the transceiver 20 provided in system 100 or a connection with a second device suitable for human-machine interaction such as, just as an example, a mobile device like a telephone. Exemplifying this, a wireless connection, such as Bluetooth® or similar, and a specific application to be installed in common mobile devices such as smartphones or tablets or another easily usable and transportable device could be used for this type of communication between the two devices.

Advantageously, through the transceiver itself or the aforementioned second device, it is possible to change the parameters of system 100 to suit the use and needs of users.

Advantageously, one or more microphones 40 suitable for capturing external sounds emitted in the proximity of the user of system 100 and, depending on the request through the user interface, directing them to each canalphone 10 can be integrated to transceiver 20.

Just as an example, microphone 40 can be a typical Lavalier microphone inserted into transceiver 20 or bodypack and then worn by the user or a precision microphone or otherwise any type of microphone.

In particular, this feature allows the user who is using the system 100 to also hear any conversations or warnings of potential danger that otherwise could not be picked up because of the acoustic isolation characteristic of this type of device.

Such isolation is desired under the conditions of use of the canalphone 10 however, under the same conditions, the person using it may wish to interrupt this isolation without removing the worn canalphone 10, an operation that moreover is not easy precisely because of the physical nature of the devices 10 that are inserted in the ear. A typical example might be a brief conversation with technicians and people nearby.

As an example, a user of system 100 who is listening to some sound content may need or want to hear a conversation taking place nearby or an alert from other users.

Even more advantageously, system 100 can be calibrated using microphone 40 connected to transceiver 20 through a sequence of calibration signals generated by transceiver 20 itself and received by microphone 40.

In addition, the transceiver or bodypack 20 comprises a plurality of buttons with which the user can interact by setting the transceiver 20. In a preferred embodiment, as visible in FIG. 1, such a transceiver 20 comprises, a first button 50, a second button 60, and a third button 70 with which the user can interact, possibly even once the interface 30 has been disconnected and the customization has been performed.

Advantageously, the aforementioned buttons can be used to listen, for example by pressing or holding down the first button 50, what is picked up by the external microphone 40. Additionally, to hear sounds already stored in the bodypack 20 and check that the setting is as desired, this can be stored by pressing or holding down the second button 60. Finally, by pressing or holding down the third button 70 can be can controlled, selected and modified the various settings stored inside the transceiver 20 of each canalphone 10.

Advantageously, to facilitate the above applications, the transceiver 20 may comprise a screen to show the various selectable settings.

In the system 100 object of the invention, each canalphone 10 is physically adapted to the person because is made on the basis of the user and the structure of his or her ear, while the customization of sound reproduction with the associated storage of parameters is carried out in the transceiver 20 apparatus or the system 100 after an initialization phase.

Thus, the storage and customization operations of the above parameters are carried out by the system 100 after an initialization phase either by the transceiver 20 or in a combined manner so as to minimize the hardware and software components of each canalphone 10, which is thus achievable in a small size.

In the aforementioned initialization phase, the person who will then wear each canalphone or a second person can act through the aforementioned interface 30 or through the transceiver 20 itself, for example, through buttons 50, 60, 70, on the transceiver 20 and change the aforementioned parameters to achieve the specific fit.

The advantages of the process just mentioned include a reduction in the space taken up by the adaptation systems currently typically built into the canalphone 10, a wider variety of parameters that can be varied and better adaptability of the transceiver itself (for example, in the transceiver, filters with better characteristics for band selectivity and stability can be implemented due to issues of space, computational capacity, etc).

The customization possibilities of each canalphone 10 can be various such as, as a non-exhaustive example:

(a) emission of "typical" or stored signals by the bodypack 20 and change of parameters such as, just as an example: treble/bass enhancement, change of frequency response, change of balance between left and right ear, all via the user interface device;

(b) emission of pre-recorded, user-specific signals traveling from the interface 30 to the "bodypack" device 20 and finally to the canalphones 10 and changing the parameters (treble/bass enhancement, change of frequency response, change of balance between left and right ear) via the user interface device;

(c) collection of music or sound signals (even live) via the microphone 40 and change of parameters (treble/bass enhancement, change of frequency response, change of balance between left and right ear) via the user interface device.

Advantageously, "canalphones" 10 can be connected to "bodypacks" 20 with reduced complexity systems, such as, by way of non-exhaustive example, systems using serial BUS, again by way of non-exhaustive example, I²S BUS.

From the description made, the characteristics of the wearable sound reproduction system and the related process that are the object of the present invention are thus clear, as are its advantages.

It is clear that numerous other variants may be made to the system in question, without departing from the principles of novelty inherent in the inventive idea, just as it is clear that, in the practical implementation of the invention, the materials, shapes and sizes of the details illustrated may be any as required, and the same may be substituted for equivalent ones.

The invention claimed is:

1. A sound reproduction system of a signal, comprising: at least a first canalphone configured for receiving a digital signal, converting said digital signal to an analog signal, and subsequently reproducing said analog signal; the system further comprising a transceiver connected via a multiplexed digital data channel, of a bidirectional type, to said first canalphone, said transceiver configured to receive said digital signal and transmit said digital signal to said at least one first canalphone, to control, store, and modify audio reproduction said parameters, and to receive, from said at least one first canalphone, further microphone signals and digital commands; first processing means of digital signals sent and transmitted by said transceiver; a bidirectional communication serial BUS connecting said transceiver to said at least one first canalphone; a converter means circuit configured to process for processing digital signals that are sent within said bidirectional communication serial BUS; second processing means placed downstream of said converter means and connected to at least one class D amplifier, said at least one class D amplifier incorporated into at least one respective canalphone and configured for performing conversion of the digital signals output by said second processing means into analog signals.

2. The system according to claim 1, wherein said parameters of a multimedia element are: delays, frequencies, volume, and balance of said signal between left and right ears of said user.

3. The system according to claim 1, further comprising an interface for customization management and modification of said parameters, said interface located downstream of said transceiver.

4. The system according to claim 1, wherein microphone signals taken from at least a first microphone are sent to a processing media.

5. The system according to claim 1, wherein said transceiver comprises at least a second microphone integrated and configured to pick up signals emitted in the proximity of a user of the system and direct them to said canalphone.

6. The system according to claim 5, wherein said transceiver comprises a first button configured to allow listening to what is captured by said first and/or second microphone, a second button configured to allow listening to what is stored in said transceiver, and a third button configured to allow control, selection, and modification of what is stored in said transceiver.

7. The system according to claim 1, wherein the multiplexed digital data channel further comprises a power signal for said at least one first canalphone.

8. A method for sound reproduction by the system according to claim 1, the method comprising:

A. interacting, by the user during an initialization phase, on said transceiver and modifying said parameters to achieve a specific adaptation of said system;

B. customizing, in a customization phase, and storing of said parameters as modified, wherein initialization phase and customization phase are either sequential or concurrent.

9. The process according to claim 8, wherein said initialization phase, the user interacts on said transceiver via a first button, a second button, and a third button and/or interface.

10. The method according to claim 8, wherein the customization phase comprises all or some of:

(a) emitting typical or stored signals from said transceiver and changing said parameters;

b) emitting pre-recorded, user-specific signals from said interface to said transceiver and then to said canalphone and possible customisation of said parameters; and c) collecting music or sound signals via said first and/or second microphone and customizing said parameters.

11. The system according to claim 1, wherein said canalphone is physically adapted to an ear based on a physiological structure of the ear.

12. The system according to claim 1, wherein said transceiver comprises a screen configured to display various selectable settings.

13. The system according to claim 1, further comprising a bodypack configured for backward compatibility with existing systems.

14. The system according to claim 1, wherein said transceiver is configured to communicate with a mobile device via Bluetooth® or other wireless technology.

15. The system according to claim 1, wherein said canalphone is configured to receive a pre-distorted signal from said transceiver.

16. The system according to claim 1, wherein said transceiver comprises a Lavalier microphone, a precision microphone, or otherwise any type of microphone.

17. The system according to claim 1, wherein said first processing means is located within said transceiver and is configured to process said digital signal, and wherein said processed digital signal is transmitted over said bidirectional communication serial BUS to at least one canalphone, the canalphone comprising at least one said class D amplifier.

18. The system according to claim 1, wherein said transceiver comprises memory for persistent storage of said parameters.

* * * * *